(12) United States Patent
Fang (10) Patent No.: US 12,332,835 B1
(45) Date of Patent: Jun. 17, 2025

(54) CALCULATOR CAPABLE OF OUTPUTTING RESULTS BASED ON HANDWRITTEN FORMULAS

(71) Applicant: Shenzhen Xingchenglida Technology Co., Ltd., Guangdo (CN)

(72) Inventor: QiEn Fang, Guangdong (CN)

(73) Assignee: Shenzhen Xingchenglida Technology Co., Ltd., Guangdo (CN)

( * ) Notice: Subject to any disclaimer, the term of this patent is extended or adjusted under 35 U.S.C. 154(b) by 0 days.

(21) Appl. No.: 19/005,765

(22) Filed: Dec. 30, 2024

(30) Foreign Application Priority Data

Dec. 24, 2024 (CN) .......................... 202423225476.3

(51) Int. Cl.
*G06F 15/02* (2006.01)
*G06F 3/04883* (2022.01)

(52) U.S. Cl.
CPC ...... *G06F 15/0216* (2013.01); *G06F 3/04883* (2013.01); *G06F 15/0225* (2013.01)

(58) Field of Classification Search
CPC .............. G06F 3/03545; G06F 3/0488; G06F 3/04883; G06F 40/111; G06F 15/0208–0225; G06F 15/025
See application file for complete search history.

(56) References Cited

U.S. PATENT DOCUMENTS

| | | | | |
|---|---|---|---|---|
| 5,428,805 | A * | 6/1995 | Morgan | G06F 15/0225 345/173 |
| 5,481,626 | A * | 1/1996 | Matsubayashi | G06F 3/04883 382/292 |
| 5,544,262 | A * | 8/1996 | Pagallo | G06V 30/1423 382/229 |
| 5,627,914 | A * | 5/1997 | Pagallo | G06V 30/32 382/229 |
| 6,226,403 | B1 | 5/2001 | Parthasarathy | |
| 8,619,045 | B2 * | 12/2013 | Yoshizawa | G06V 30/373 345/173 |
| 8,659,567 | B2 * | 2/2014 | Yoshizawa | G06F 3/04883 345/173 |
| 9,019,308 | B2 | 4/2015 | Karoji | |
| 9,904,847 | B2 | 2/2018 | Onis | |
| 2010/0146457 | A1 * | 6/2010 | Thimbleby | G06F 3/04883 715/863 |
| 2015/0370376 | A1 * | 12/2015 | Harley | G06F 3/0447 345/174 |

* cited by examiner

*Primary Examiner* — Matthew D Sandifer
(74) *Attorney, Agent, or Firm* — Ying-Ting Chen (57) ABSTRACT

The present invention provides a calculator capable of outputting results based on handwritten formulas, wherein the calculator has at least one writing area, and can output the calculation results of the handwritten formulas in the writing area, wherein the setting of the writing area does not compromise the functional completeness of the calculator compared to a traditional calculator, and also does not change the operating habits when using the calculator as a traditional calculator, that is, the calculator provides different methods to obtain calculation results and allows verification of the calculation results obtained using an alternative method. This reduces the probability of errors in the calculation results caused by user mistakes when compared to verifying the calculation results using the same method.

14 Claims, 4 Drawing Sheets

CALCULATOR CAPABLE OF OUTPUTTING RESULTS BASED ON HANDWRITTEN FORMULAS

BACKGROUND OF THE PRESENT INVENTION

Field of Invention

The present invention relates to the field of calculators, and particularly relates to a calculator capable of outputting results based on handwritten formulas.

Description of Related Arts

Calculators, as a simple, efficient, and low-cost auxiliary calculation device, are widely used in daily life, study, and work, and have even become one of the essential tools for learning and office work. However, in the use scenario of calculators, a common scene is that users need to additionally prepare pen and paper to record the calculation results while using the calculator. This is because even for simple arithmetic operations, the calculation result output by an arithmetic calculator is obtained by performing the calculation step by step according to the input order. For example, in an arithmetic calculator, sequentially inputting 2+2×2 will first perform the calculation of 2+2 step by step, and then perform the calculation of 4×2 based on the previous calculation result. This calculation logic does not conform to the rule of performing calculations based on the priority of operators, so users need to break down the formula into steps based on the priority rule of operators, and record intermediate results using paper and pen for subsequent calculations.

Although the calculation logic of scientific calculators conforms to the rule of performing calculations based on the priority of operators, inputting complex formulas into a scientific calculator often requires converting the formula into a format conform to the input rules preset by the scientific calculator. For example, for the formula $$\frac{6}{2+3},$$

when inputting the formula into the scientific calculator, it is necessary to convert it to the input form of 6÷(2+3). That is to say, when inputting a certain formula into a scientific calculator for calculation, the input form of the formula may be completely different from the written form of the formula, especially when there are function operators in the formula; the conversion of the written form of the formula will be more complex and it will be difficult to ensure calculation efficiency and accuracy of calculation results. Therefore, even when using a scientific calculator to calculate the corresponding formula, in order to ensure calculation efficiency and accuracy of calculation results, in the actual use process, users still need to perform step-by-step calculations on the arithmetic formula based on the priority rule of operators, and record the calculation results with pen and paper for input in the next step of calculation.

In summary, when using calculators, there are often situations where it is necessary to additionally prepare pen and paper to record the calculation results step by step. Some existing calculator manufacturers have developed calculators with a flexible writing screen further configured in the structure in response to this situation, but these calculators still need to perform step-by-step calculations on the arithmetic formula in use, which is difficult to ensure calculation efficiency, and the writing experience of the flexible writing screen is also far inferior to that of paper.

SUMMARY OF THE PRESENT INVENTION

An objective of the present invention is to provide a calculator capable of outputting results based on handwritten formulas, wherein the calculator has at least one writing area compared to a traditional calculator, and can output the calculation result of the handwritten formula in the writing area, thus eliminating the need for step-by-step calculation or conversion of the arithmetic formula, thereby improving calculation efficiency.

Another objective of the present invention is to provide a calculator capable of outputting results based on handwritten formulas, wherein the setting of the writing area does not compromise the functional completeness of the calculator compared to a traditional calculator, and also does not change the operating habits when using the calculator as a traditional calculator, making it widely applicable and easy to adopt with minimal learning cost.

Another objective of the present invention is to provide a calculator capable of outputting results based on handwritten formulas, wherein when the user uses the calculator as a traditional calculator to perform step-by-step calculations on the arithmetic formula, the setting of the writing area facilitates the user to record the calculation results in the writing area, thus making the operation more convenient.

Another objective of the present invention is to provide a calculator capable of outputting results based on handwritten formulas, wherein the calculator can output the calculation results of the handwritten formulas in the writing area, and can also perform step-by-step calculations on arithmetic formulas as a traditional calculator, that is, the calculator provides different methods to obtain calculation results and allows verification of the calculation results obtained using an alternative method. This reduces the probability of errors in the calculation results caused by user mistakes when compared to verifying the calculation results using the same method.

Another objective of the present invention is to provide a calculator capable of outputting results based on handwritten formulas, wherein the calculator comprises a display screen similar to traditional calculators. The display screen is used to display the calculation results of handwritten formula in the writing area, thus maintaining the cost advantage and structural simplicity of the calculator by reusing the display screen.

Another objective of the present invention is to provide a calculator capable of outputting results based on handwritten formulas, wherein at least one writing area is configured as a writing area formed by a liquid crystal writing board, thereby maintaining the cost advantage of the calculator based on the low-cost advantage of the liquid crystal writing board.

Another objective of the present invention is to provide a calculator capable of outputting results based on handwritten formulas, wherein at least one writing area is configured as a paper placement region formed by a paper clip. This configuration ensures a writing experience comparable to paper while allowing for repeated use of the writing area by replacing the paper, thereby reducing the cost of using the calculator.

Another objective of the present invention is to provide a calculator capable of outputting results based on handwritten formulas, wherein a flexible sensing layer is configured in the writing area, which allows the user's writing traces in the writing area to be sensed based on the configuration of the flexible sensing layer, thus allowing the subsequent identification and analysis of the user's writing traces in the writing area to output the calculation result of the handwritten formula in the writing area on the display screen.

Another objective of the present invention is to provide a calculator capable of outputting results based on handwritten formulas, wherein the calculator is further equipped with a wireless module, wherein after identifying and analyzing the writing traces of the user in the writing area, the data information corresponding to the writing content of the user in the writing area can be transmitted externally through the wireless module, thereby realizing the storage and reproduction of the writing content of the user in the writing area on other devices.

To achieve at least one of the above objectives, the present invention provides a calculator capable of outputting results based on handwritten formulas, wherein the calculator has at least one writing area, and comprises a power supply unit, a calculation processor electrically connected to the power supply unit, a keypad circuit and a display screen electrically connected to the calculation processor, a central data processor electrically connected to the power supply unit, an identification calculation module electrically connected to the central data processor, and at least one flexible sensing layer electrically connected to the identification calculation module, wherein the central data processor is further electrically connected to the display screen, and the flexible sensing layer is configured within the writing area, so that the writing trace in the writing area can be sensed by the flexible sensing layer and data information corresponding to the writing trace can be generated in the identification calculation module, thus allowing the central data processor to control the display of the calculation result of the formula handwritten in the writing area on the display screen after subsequent identification and analysis of the data information.

In one embodiment, wherein the identification and analysis of the data information are performed based on the following steps: the identification calculation module transmits the data information to the central data processor. After receiving the data information, the central data processor retrieves corresponding data stored internally in a corresponding data storage unit electrically connected to the central data processor or the identification calculation module, to process the data information and obtain the calculation result of the handwritten formula in the writing area.

In one embodiment, wherein the calculator further comprises a wireless module, wherein the wireless module is electrically connected to the central data processor. When the calculator is connected to the internet via the wireless module, the identification and analysis of the data information are performed based on the following steps: the identification calculation module transmits the data information to the central data processor. After receiving the data information, the central data processor processes the data information accordingly and transmits the data information to a server via the wireless module. The server processes the received information based on its internal data and feeds the processed information back to the central data processor via the wireless module. Based on the received feedback information, the central data processor obtains the calculation result of the handwritten formula in the writing area.

In one embodiment, wherein the calculator further comprises at least one control button electrically connected to the identification calculation module or the central data processor, and the at least one control button is used to control the calculator to output the calculation results of the handwritten formula that have been or will be handwritten in the writing area.

In one embodiment, wherein the calculator further comprises an audio output unit, wherein the audio output unit is electrically connected to the central data processor. The calculator is further configured to allow the at least one control button to control the volume of the audio output unit.

In one embodiment, wherein the writing area is configured as a writing region formed by a liquid crystal writing board, and the liquid crystal writing board is arranged above the flexible sensing layer.

In one embodiment, wherein the display screen, the corresponding buttons of the keypad circuit, and the writing area of the calculator are sequentially arranged in the upper, middle, and lower regions of the same working surface.

In one embodiment, wherein the calculator is designed to be foldable and has two working surfaces, where the display screen and the corresponding buttons of the keypad circuit of the calculator are arranged on the same working surface, while the writing area of the calculator is arranged on another working surface.

In one embodiment, wherein the calculator comprises a first flexible protective layer, a second flexible protective layer, and a housing, wherein the housing is fixed to the first flexible protective layer, and the power supply unit, the calculation processor, the keypad circuit, the display screen, the central data processor, and the identification calculation module are all arranged within the housing, correspondingly form a structural form in which the display screen and the corresponding buttons of the keypad circuit are arranged on the same working surface as in a traditional calculator, wherein the liquid crystal writing board is arranged on the second flexible protective layer, forming the writing area on the second flexible protective layer, the flexible sensing layer is arranged as a sandwich layer within the second flexible protective layer and is configured in the writing area, correspondingly forms a structural form in which the writing area of the calculator is arranged on another working surface, wherein the first flexible protective layer and the second flexible protective layer are flexibly connected to form a foldable structure between the two working surfaces.

In one embodiment, wherein the number of the writing areas is two, wherein one of the writing areas is configured as a writing region formed by a liquid crystal writing board, and the other writing area is configured as a paper placement region formed by a paper clip, correspondingly, the number of the flexible sensing layers configured in the writing area is also two, wherein the two flexible sensing layers is arranged to be interconnected via flat cable, with one of the flexible sensing layers electrically connected to the identification calculation module, forming an electrical connection relationship between the two flexible sensing layers and the identification calculation module.

In one embodiment, wherein the calculator is designed to be foldable and has two working surfaces, wherein the display screen, the corresponding buttons of the keypad circuit, and the writing area configured as a writing region formed by the liquid crystal writing board, are arranged on the same working surface, while the writing area configured as a paper placement region formed by the paper clip, is arranged on another working surface.

In one embodiment, wherein the calculator comprises a first flexible protective layer, a second flexible protective layer, and a housing, wherein the housing is fixed to the first flexible protective layer, the power supply unit, the calculation processor, the keypad circuit, the display screen, the central data processor, the identification calculation module, the liquid crystal writing board, and one of the flexible sensing layers are all arranged in the housing, correspondingly form a structural form in which the display screen, the corresponding buttons of the keypad circuit, and the writing region formed by the liquid crystal writing board are arranged on the same working surface, wherein the paper clip is arranged on the second flexible protective layer, forming another writing area in the second flexible protective layer, the other flexible sensing layer is arranged in a sandwich form between the second flexible protective layer and is configured in the writing area, correspondingly forms a structural form in which the writing area configured as a paper placement region formed by the paper clip is arranged on another working surface, the first flexible protective layer and the second flexible protective layer are flexibly connected to form a foldable structure between the two working surfaces.

In one embodiment, wherein the first flexible protective layer has an intermediate layer arranged in a sandwich form, the housing is fixed to the first flexible protective layer in a state of being fixed to the intermediate layer.

In one embodiment, wherein the outer layer of the first flexible protective layer, which has a sandwich structure, and the outer layer of the second flexible protective layer, which also has a sandwich structure, are integrally connected leather layers, thereby forming a flexibly connected structural between the first flexible protective layer and the second flexible protective layer.

Through understanding the subsequent descriptions and the attached drawings, the further objectives and advantages of the present invention can be fully demonstrated.

DETAILED DESCRIPTION OF THE PREFERRED EMBODIMENT

The following description is used to disclose the present invention so that those skilled in the art can implement the present invention. The preferred embodiments in the following description are only examples, and those skilled in the art can think of other obvious variations. The basic principles of the present invention defined in the following description can be applied to other embodiments, modifications, improvements, equivalents, and other technical solutions without departing from the spirit and scope of the present invention.

Those skilled in the art should understand that in the disclosure of the present invention, terms such as 'longitudinal,' 'transverse,' 'upper,' 'lower,' 'front,' 'rear,' 'left,' 'right,' 'vertical,' 'horizontal,' 'top,' 'bottom,' 'inside,' 'outside,' etc., indicating orientation or positional relationships, are based on the orientation or positional relationships shown in the drawings. These are for the convenience of describing the present invention and simplifying the description, and do not indicate or imply that the referred device or component must have a specific orientation or be constructed and operated in a specific orientation, thus these terms should not be understood as limiting the present invention.

It should be understood that the term "a" should be interpreted to mean "at least one" or "one or more." In one embodiment, the number of an element can be one, while in another embodiment, the number of that element can be multiple. The term "a" should not be interpreted as a limitation on quantity.

Figure 1:
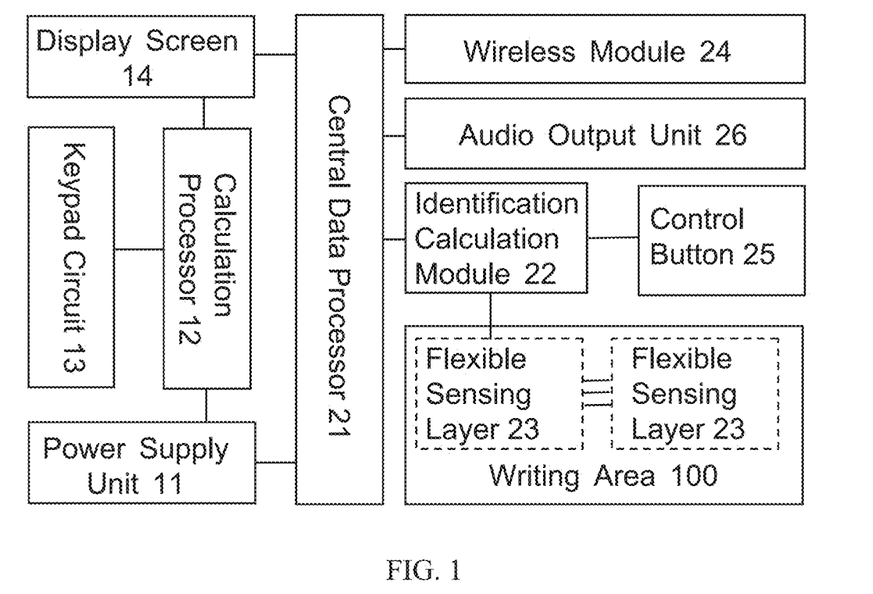
FIG. 1 is a structural block diagram of a calculator capable of outputting results based on a handwritten formulas according to one embodiment of the present invention.

Referring to FIG. 1 of the drawings attached to the specification of the present invention, a structural block diagram of a calculator capable of outputting results based on handwritten formulas according to an embodiment of the present invention is illustrated, wherein the calculator comprises at least one writing area 100 compared to a traditional calculator, and is capable of outputting the calculation result of the handwritten formula in the writing area 100, thus eliminating the need for step-by-step calculation or conversion of the arithmetic formula, thereby improving calculation efficiency.

Specifically, in this embodiment of the present invention, the calculator corresponds to a traditional calculator, comprising a power supply unit 11, a calculation processor 12 electrically connected to the power supply unit 11, a keypad circuit 13 and a display screen 14 electrically connected to the calculation processor 12. This enables the calculator to retain the functional completeness of a traditional calculator.

In particular, in this embodiment of the present invention, the calculator, corresponds to a traditional calculator, further comprises a central data processor 21 electrically connected to the power supply unit 11, an identification calculation module 22 electrically connected to the central data processor 21, and at least one flexible sensing layer 23 electrically connected to the identification calculation module 22, wherein the central data processor 21 is further electrically connected to the display screen 14, and the flexible sensing layer 23 is configured within the writing area 100, so that the writing trace in the writing area 100 can be sensed by the flexible sensing layer 23 and data information corresponding to the writing trace can be generated in the identification calculation module 22 electrically connected to the flexible sensing layer 23, thus allowing the central data processor 21 electrically connected to the identification calculation module 22 to control the display of the calculation result of the formula handwritten in the writing area 100 on the display screen 14 after subsequent identification and analysis of the data information.

In other words, the calculator can output the calculation results of the handwritten formulas in the writing area 100, and can also perform step-by-step calculations on arithmetic formulas as a traditional calculator, that is, the calculator provides different methods to obtain calculation results and allows verification of the calculation results obtained using an alternative method. This reduces the probability of errors in the calculation results caused by user mistakes when compared to verifying the calculation results using the same method.

It is worth mentioning that the process of identifying and analyzing the aforementioned data information generated in the identification calculation module 22 can be optionally performed by the identification calculation module 22 itself or the central data processor 21, but is not limited to being executed by the identification calculation module 22 or the central data processor 21.

For example, in this embodiment of the present invention, the calculator further comprises a wireless module 24, wherein the wireless module 24 is electrically connected to the central data processor 21. When the calculator is connected to the internet via the wireless module 24, the identification calculation module 22 transmits the aforementioned data information to the central data processor 21. After receiving the data information, the central data processor 21 processes the data information accordingly and transmits the data information to a server via the wireless module 24. The server processes the received information based on its internal data (such as calculation data, text data, image data, and image recognition data, etc.) and feeds the processed information back to the central data processor 21 via the wireless module 24. Based on the received feedback information, the central data processor 21 obtains the calculation result of the handwritten formula in the writing area 100 and displays the calculation result on the display screen 14.

For another example, when the calculator is not equipped with the wireless module 24 or when the calculator is equipped with the wireless module 24 but not connected to the internet, the identification calculation module 22 transmits the aforementioned data information to the central data processor 21. After receiving the data information, the central data processor 21 retrieves the data (such as calculation data, text data, image data, and image recognition data, etc.) stored internally in the corresponding data storage unit electrically connected to the central data processor 21 or the identification calculation module 22, to process the data information and obtain the calculation result of the handwritten formula in the writing area 100, and displays the calculation result on the display screen 14.

It is worth mentioning that when the calculator is equipped with the aforementioned wireless module 24, after the calculator identifies and analyzes the writing traces of the user in the writing area 100, the data information corresponding to the writing content of the user in the writing area 100 can also be transmitted externally through the wireless module 24, thereby realizing the storage and reproduction of the writing content of the user in the writing area 100 on other devices.

Specifically, in this embodiment of the present invention, the calculator further comprises at least one control button 25 electrically connected to the identification calculation module 22 or the central data processor 21, and the at least one control button 25 is used to control the calculator to output the calculation result of the handwritten formula that have been or will be handwritten in the writing area 100.

For example, the calculator is configured to allow the at least one control button 25 to control the identification calculation module 22 to generate data information corresponding to the formula already or subsequently handwritten in the writing area 100, and then based on the identification and analysis of the data information, the central data processor 21 electrically connected to the identification calculation module 22 controls the display of the calculation result of the handwritten formula in the writing area 100 on the display screen 14.

In other words, the at least one control button 25 is configured to control the execution of the necessary steps for the calculator to display the calculation results of formula handwritten in the writing area 100 on the display screen 14. These steps include, but are not limited to, determining the handwritten time period or region to be identified, but the present invention does not limit the specific steps that the calculator needs to execute under the control of the control button 25.

Furthermore, in this embodiment of the present invention, the calculator further comprises an audio output unit 26, wherein the audio output unit 26 is electrically connected to the central data processor 21. The calculator is further configured to allow the at least one control button 25 to control the volume of the audio output unit 26. Thereby, the calculation result of the handwritten formula in the writing area 100 can be further broadcast by the audio output unit 26.

Figure 2A:
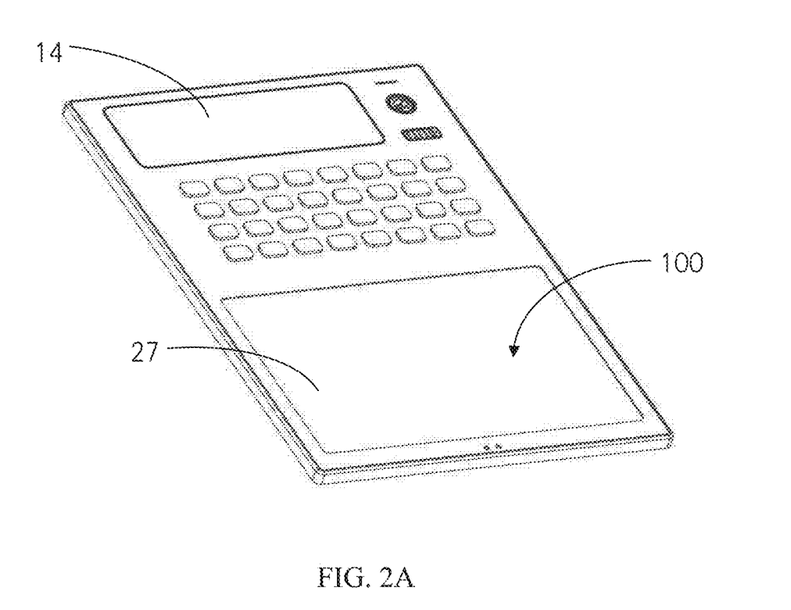
FIGS. 2A and 2B are the schematic diagrams of one product structure of the calculator capable of outputting results based on a handwritten formulas according to the above-mentioned embodiment of the present invention.
Figure 2B:
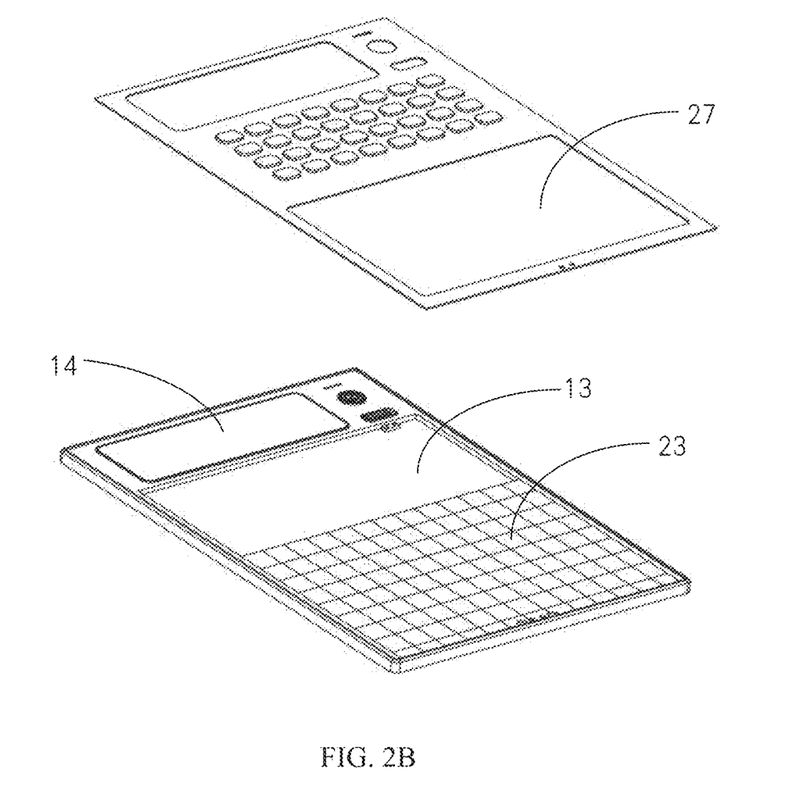

Referring to FIGS. 2A and 2B of the drawings attached to the specification of the present invention, a product structure of the calculator corresponding to the structural block diagram shown in FIG. 1 is illustrated. In this product structure of the calculator of the present invention, the writing area 100 is configured as a writing region formed by a liquid crystal writing board 27, and the liquid crystal writing board 27 is arranged above the flexible sensing layer 23, so as to enable the writing traces on the liquid crystal writing board 27 to be sensed by the flexible sensing layer 23 and generate data information corresponding to the writing traces in the identification calculation module 22 electrically connected to the flexible sensing layer 23. Based on the low-cost advantage of the liquid crystal writing board 27, the cost advantage of the calculator is maintained.

Furthermore, the liquid crystal writing board 27 has a clear screen circuit and a clear screen button electrically connected to the clear screen circuit, wherein the clear screen circuit is electrically connected to the power supply unit 11. When the clear screen button is activated, the clear screen circuit releases voltage to the liquid crystal writing board 27 to scatter the liquid crystal molecules within the liquid crystal writing board 27 and clear the writing traces on the liquid crystal writing board 27.

It is worth mentioning that in this product structure of the calculator of the present invention, the display screen 14, the corresponding buttons of the keypad circuit 13, and the writing area 100 of the calculator are arranged on the same working surface, thereby avoiding the cross-housing electrical connection layouts, which is beneficial for maintaining the cost advantage of the calculator while ensuring the durability of the calculator.

Specifically, in this product structure of the calculator, the display screen 14, the corresponding buttons of the keypad circuit 13, and the writing area 100 of the calculator are sequentially arranged in the upper, middle, and lower regions of the same working surface. This arrangement ensures that the setting of the writing area 100 does not compromise the functional completeness of the calculator compared to a traditional calculator, and also does not change the operating habits when using the calculator as a traditional calculator, making it widely applicable and easy to adopt with minimal learning cost.

Figure 3A:
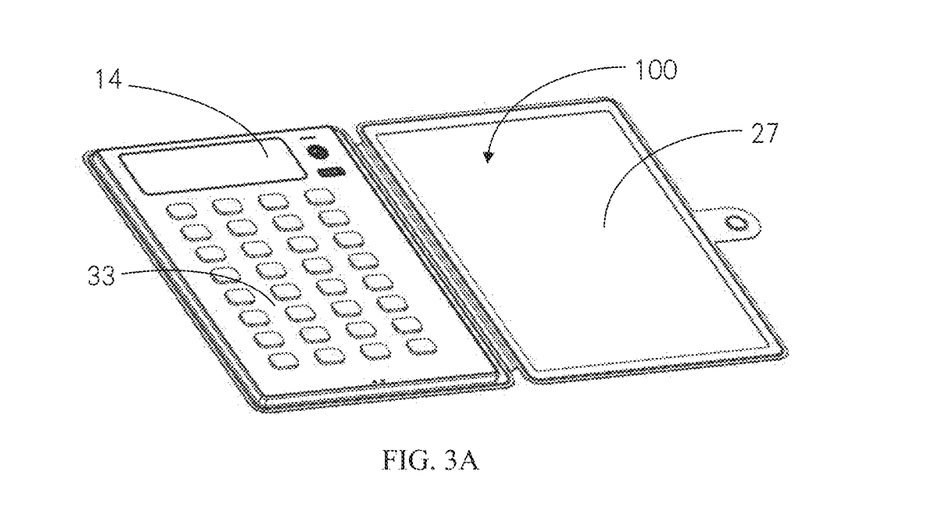
FIGS. 3A and 3B are the schematic diagrams of another product structure of the calculator capable of outputting results based on a handwritten formulas according to the above-mentioned embodiment of the present invention.
Figure 3B:
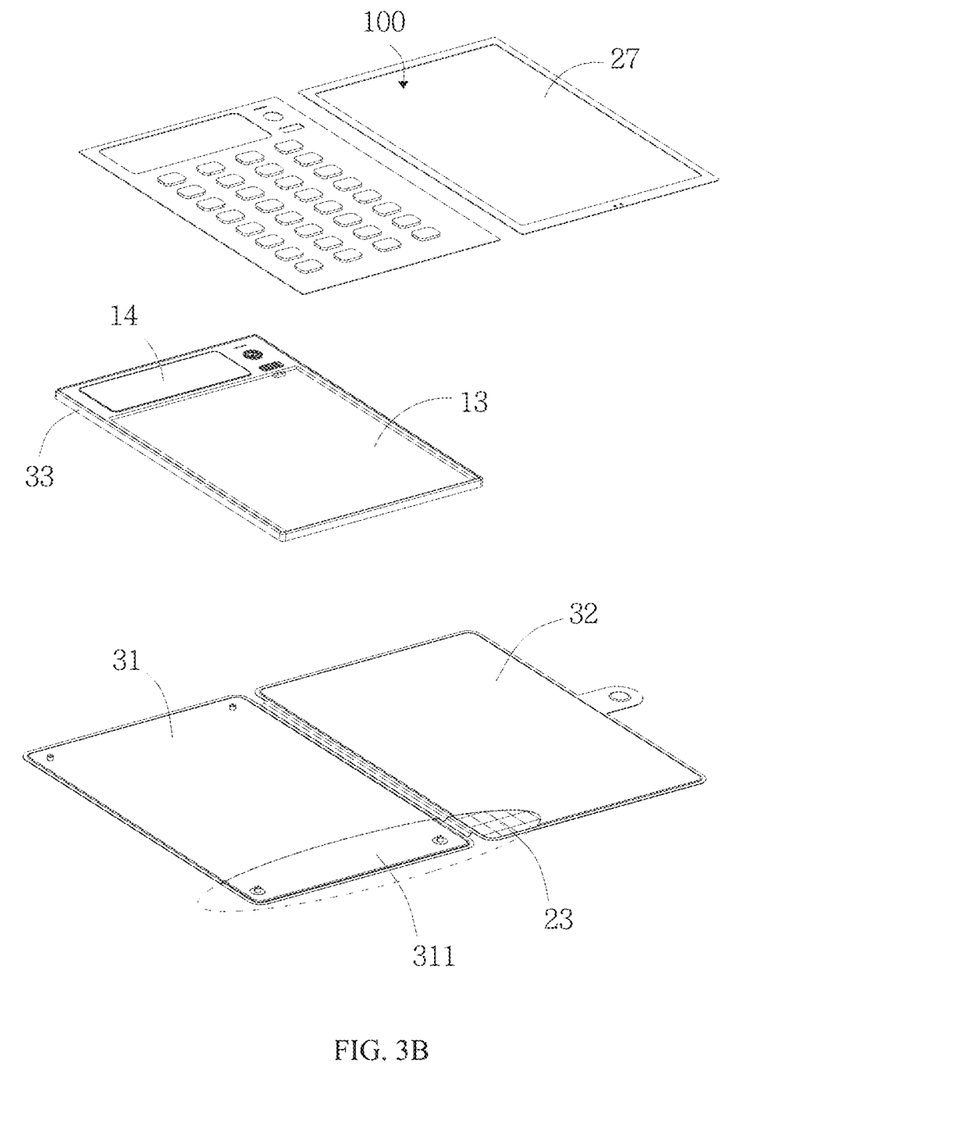

Referring to FIGS. 3A and 3B of the drawings attached to the specification of the present invention, another product structure of the calculator corresponding to the structural block diagram shown in FIG. 1 is illustrated. In this product structure of the calculator of the present invention, the writing area 100 is also configured as a writing region formed by a liquid crystal writing board 27. Unlike the product structure shown in FIGS. 2A and 2B, in this product structure of the calculator of the present invention, the calculator is designed to be foldable and has two working surfaces. The display screen 14 and the corresponding buttons of the keypad circuit 13 of the calculator are arranged on the same working surface, similar to a traditional calculator, while the writing area 100 of the calculator is arranged on another working surface. Structurally, the corresponding structure between the two working surfaces are designed to form a foldable structure through a flexible connection structure or a pivotable connecting method, and the circuit connection between the two working surfaces is arranged by a flat cable. This design allows the calculator to have a notebook-like style, enabling it to be used independently as a traditional calculator, independently as a writing board, or combined to display the calculation result of the formula handwritten in the writing area 100 on the display screen 14.

Specifically, in this product structure of the calculator of the present invention, the calculator comprises a first flexible protective layer 31, a second flexible protective layer 32, and a housing 33, wherein the housing 33 is fixed to the first flexible protective layer 31, and the power supply unit 11, the calculation processor 12, the keypad circuit 13, the display screen 14, the central data processor 21, and the identification calculation module 22 are all arranged within the housing 33, correspondingly form a structural form in which the display screen 14 and the corresponding buttons of the keypad circuit 13 are arranged on the same working surface as in a traditional calculator. The liquid crystal writing board 27 is arranged on the second flexible protective layer 32, forming the writing area 100 on the second flexible protective layer 32, wherein the flexible sensing layer 23 is arranged as a sandwich layer within the second flexible protective layer 32 and is configured in the writing area 100, correspondingly forms a structural form in which the writing area 100 of the calculator is arranged on another working surface, wherein the first flexible protective layer 31 and the second flexible protective layer 32 are flexibly connected to form a foldable structure between the two working surfaces.

It is worth mentioning that in this product structure of the calculator of the present invention, the first flexible protective layer 31 has an intermediate layer 311 arranged in a sandwich form, wherein the housing 33 is fixed to the first flexible protective layer 31 in a state of being fixed to the intermediate layer 311. However, in other product structures of the calculator of the present invention, the housing 33 can be optionally directly bonded and fixed to the first flexible protective layer 31, and the present invention does not limit this.

Furthermore, in this product structure of the calculator, the outer layer of the first flexible protective layer 31, which has a sandwich structure, and the outer layer of the second flexible protective layer 32, which also has a sandwich structure, are integrally connected leather layers. This configuration forms a flexibly connected structural between the first flexible protective layer 31 and the second flexible protective layer 32.

Figure 4A:
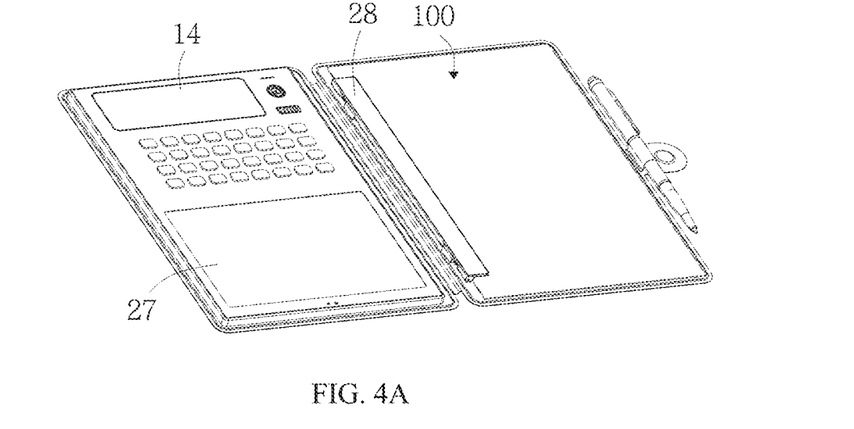
FIGS. 4A and 4B are the schematic diagrams of another product structure of the calculator capable of outputting results based on a handwritten formulas according to the above-mentioned embodiment of the present invention.
Figure 4B:
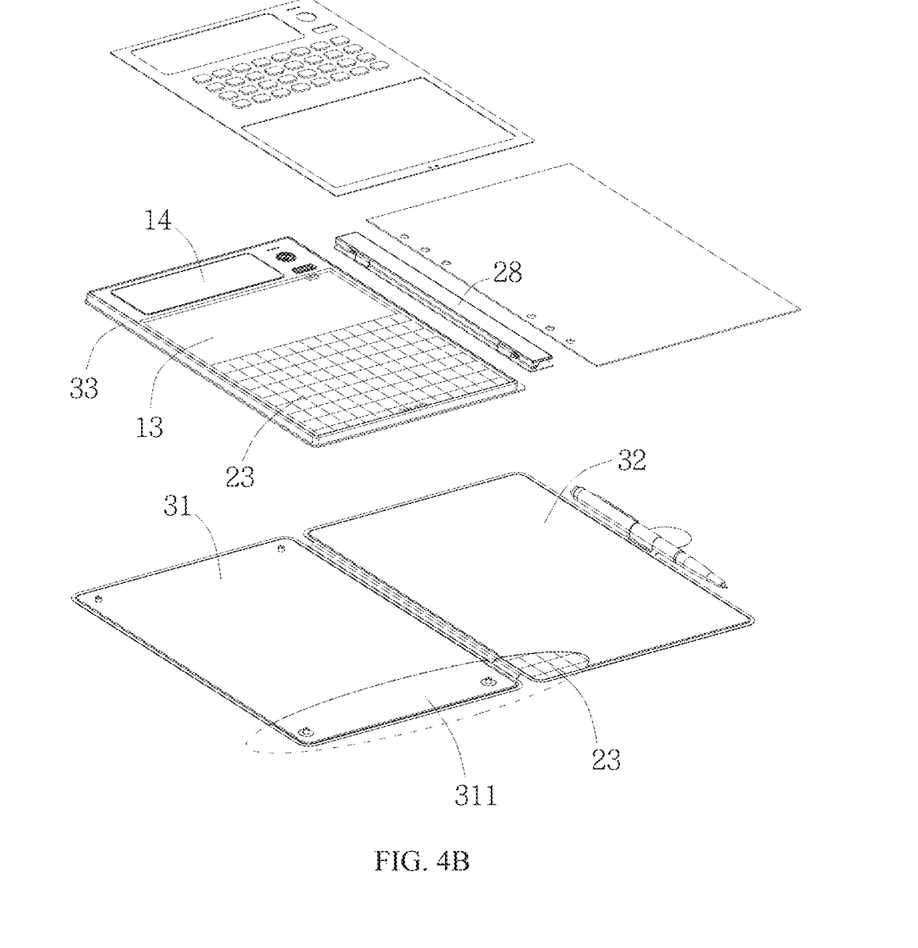

Further referring to FIGS. 4A and 4B of the drawings attached to the specification of the present invention, another product structure of the calculator corresponding to the structural block diagram shown in FIG. 1 is illustrated. In this product structure of the calculator of the present invention, the number of the writing areas 100 is two, wherein one of the writing areas 100 is configured as a writing region formed by a liquid crystal writing board 27, and this writing area 100 is arranged on the same working surface as the display screen 14 and the corresponding buttons of the keypad circuit 13 in the calculator shown in FIGS. 2A and 2B. The other writing area 100 is configured as a paper placement region formed by a paper clip 28. This design allows the calculator to have a notebook-like style on the product form, enabling the user to write on the writing area 100 while maintaining the writing experience of a notebook, and at the same time, the repeated writing in the writing area 100 can be realized through the replacement of paper, thereby reducing the cost of using the calculator.

In other words, in this product structure of the calculator of the present invention, the calculator is also designed to be foldable with two working surfaces. The display screen 14, the corresponding buttons of the keypad circuit 13, and the writing area 100 configured as a writing region formed by the liquid crystal writing board 27, are arranged on the same working surface, while the writing area 100 configured as a paper placement region formed by a paper clip 28, is arranged on another working surface. Structurally, the corresponding structure between the two working surfaces are designed to form a foldable structure through a flexible connection structure or a pivotable connecting method, and the circuit connection between the two working surfaces is arranged by a flat cable.

Corresponding to this product structure of the calculator of the present invention, the number of the flexible sensing layers 23 configured in the writing area 100 is also two. The two flexible sensing layers 23 can optionally be arranged to be interconnected via flat cable, with one of the flexible sensing layers 23 electrically connected to the identification calculation module 22, thereby forming an electrical connection relationship between the two flexible sensing layers 23 and the identification calculation module 22. Alternatively, the two flexible sensing layers 23 can be arranged to be electrically connected to the identification calculation module 22 separately. The present invention does not limit this.

For example, in this product structure of the calculator of the present invention, the calculator comprises a first flexible protective layer 31, a second flexible protective layer 32, and a housing 33, wherein the housing 33 is fixed to the first flexible protective layer 31. The power supply unit 11, the calculation processor 12, the keypad circuit 13, the display screen 14, the central data processor 21, the identification calculation module 22, the liquid crystal writing board 27, and one of the flexible sensing layers 23 are all arranged in the housing 33, correspondingly form a structural form in which the display screen 14, the corresponding buttons of the keypad circuit 13, and the writing region formed by the liquid crystal writing board 27, are arranged on the same working surface. The paper clip 28 is arranged on the second flexible protective layer 32, and the second flexible protective layer 32 forms another writing area 100, wherein the other flexible sensing layer 23 is arranged in a sandwich form between the second flexible protective layer 32 and is configured in this writing area 100, correspondingly forms a structural form in which the writing area 100 configured as a paper placement region formed by the paper clip 28, is arranged on another working surface. The first flexible protective layer 31 and the second flexible protective layer 32 are flexibly connected to form a foldable structure between the two working surfaces.

Similarly, in this product structure of the calculator of the present invention, the first flexible protective layer 31 has an intermediate layer 311 arranged in a sandwich form, wherein the housing 33 is fixed to the first flexible protective layer 31 in a state of being fixed to the intermediate layer 311. However, in other product structures of the calculator of the present invention, the housing 33 can be optionally directly bonded and fixed to the first flexible protective layer 31, and the present invention does not limit this.

Furthermore, in this product structure of the calculator, the outer layer of the first flexible protective layer 31, which has a sandwich structure, and the outer layer of the second flexible protective layer 32, which also has a sandwich structure, are integrally connected leather layers. This configuration forms a flexibly connected structural between the first flexible protective layer 31 and the second flexible protective layer 32.

It is worth mentioning that in these product structures of the calculator of the present invention, the flexible sensing layer 23 can be optionally configured as an electromagnetic sensing layer, a capacitive sensing layer, or a pressure sensing layer based on actual needs. The specific type of the flexible sensing layer 23 does not limit the scope of the present invention.

Those skilled in the art will understand that the above product structures are merely examples, and the features of different product structures can be combined to obtain embodiments that are easily conceived by those of ordinary skill in the art based on the content disclosed in the present invention but not explicitly pointed out in the drawings.

Those skilled in the art will understand that the embodiments and examples described above, as well as the drawings illustrating the principles of the invention, are merely illustrative and do not limit the invention. The objectives of the invention have been fully and effectively realized. The functions and structural principles of the invention have been shown and described in the embodiments, and without departing from these principles, the invention can be embodied in various forms and modification.

What is claimed is:

1. A calculator capable of outputting results based on handwritten formulas, said calculator has at least one writing area, and comprises a power supply unit, a calculation processor electrically connected to said power supply unit, a keypad circuit and a display screen electrically connected to said calculation processor, a central data processor electrically connected to said power supply unit, an identification calculation module electrically connected to said central data processor, and at least one flexible sensing layer electrically connected to said identification calculation module, wherein said central data processor is further electrically connected to said display screen, and said flexible sensing layer is configured within said writing area, so that a writing trace in said writing area can be sensed by said flexible sensing layer and data information corresponding to said writing trace can be generated in said identification calculation module, thus allowing said central data processor to control the display of a calculation result of a formula handwritten in said writing area on said display screen after subsequent identification and analysis of said data information, wherein the identification and analysis of said data information are performed based on the following steps: said identification calculation module transmits said data information to said central data processor, after receiving said data information, said central data processor retrieves corresponding data stored internally in a corresponding data storage unit electrically connected to said central data processor or said identification calculation module, to process said data information and obtain the calculation result of the handwritten formula in said writing area, wherein said calculator further comprises a wireless module, wherein said wireless module is electrically connected to said central data processor, when said calculator is connected to the internet via said wireless module, the identification and analysis of said data information are performed based on the following steps: said identification calculation module transmits said data information to said central data processor, after receiving said data information, said central data processor processes said data information accordingly and transmits said data information to a server via said wireless module, said server processes the received information based on its internal data and feeds the processed information back to said central data processor via said wireless module, based on the received feedback information, said central data processor obtains the calculation result of the handwritten formula in said writing area.

2. The calculator capable of outputting results based on handwritten formulas, as recited in claim 1, wherein said calculator further comprises at least one control button electrically connected to said identification calculation module or said central data processor, and said at least one control button is used to control said calculator to output the calculation results of the handwritten formula that have been or will be handwritten in the writing area.

3. The calculator capable of outputting results based on handwritten formulas, as recited in claim 2, wherein said calculator further comprises an audio output unit, said audio output unit is electrically connected to said central data processor, said calculator is further configured to allow said at least one control button to control the volume of said audio output unit.

4. The calculator capable of outputting results based on handwritten formulas, as recited in claim 1, wherein said writing area is configured as a writing region formed by a liquid crystal writing board, and said liquid crystal writing board is arranged above said flexible sensing layer.

5. The calculator capable of outputting results based on handwritten formulas, as recited in claim 4, wherein said display screen, corresponding buttons of said keypad circuit, and said writing area of said calculator are sequentially arranged in the upper, middle, and lower regions of the same working surface.

6. A calculator capable of outputting results based on handwritten formulas, said calculator has at least one writing area, and comprises a power supply unit, a calculation processor electrically connected to said power supply unit, a keypad circuit and a display screen electrically connected to said calculation processor, a central data processor electrically connected to said power supply unit, an identification calculation module electrically connected to said central data processor, and at least one flexible sensing layer electrically connected to said identification calculation module, wherein said central data processor is further electrically connected to said display screen, and said flexible sensing layer is configured within said writing area, so that a writing trace in said writing area can be sensed by said flexible sensing layer and data information corresponding to said writing trace can be generated in said identification calculation module, thus allowing said central data processor to control the display of a calculation result of a formula handwritten in said writing area on said display screen after subsequent identification and analysis of said data information, wherein said writing area is configured as a writing region formed by a liquid crystal writing board, and said liquid crystal writing board is arranged above said flexible sensing layer, wherein said calculator is designed to be foldable and has two working surfaces, where said display screen and corresponding buttons of said keypad circuit of said calculator are arranged on the same working surface, while said writing area of the calculator is arranged on another working surface.

7. The calculator capable of outputting results based on handwritten formulas, as recited in claim 6, wherein said calculator comprises a first flexible protective layer, a second flexible protective layer, and a housing, wherein said housing is fixed to said first flexible protective layer, and said power supply unit, said calculation processor, said keypad circuit, said display screen, said central data processor, and said identification calculation module are all arranged within said housing, correspondingly forms a structural form in which said display screen and the corresponding buttons of said keypad circuit are arranged on the same working surface as in a calculator, wherein said liquid crystal writing board is arranged on said second flexible protective layer, forming said writing area on said second flexible protective layer, said flexible sensing layer is arranged as a sandwich layer within said second flexible protective layer and is configured in said writing area, correspondingly forms a structural form in which said writing area of said calculator is arranged on another working surface, wherein said first flexible protective layer and said second flexible protective layer are flexibly connected to form a foldable structure between the two working surfaces.

8. The calculator capable of outputting results based on handwritten formulas, as recited in claim 7, wherein said first flexible protective layer has an intermediate layer arranged in a sandwich form, said housing is fixed to said first flexible protective layer in a state of being fixed to said intermediate layer.

9. The calculator capable of outputting results based on handwritten formulas, as recited in claim 8, wherein an outer layer of said first flexible protective layer, which has a sandwich structure, and an outer layer of said second flexible protective layer, which also has a sandwich structure, are integrally connected leather layers, thereby forming a flexibly connected structural between said first flexible protective layer and said second flexible protective layer.

10. A calculator capable of outputting results based on handwritten formulas, said calculator has at least one writing area, and comprises a power supply unit, a calculation processor electrically connected to said power supply unit, a keypad circuit and a display screen electrically connected to said calculation processor, a central data processor electrically connected to said power supply unit, an identification calculation module electrically connected to said central data processor, and at least one flexible sensing layer electrically connected to said identification calculation module, wherein said central data processor is further electrically connected to said display screen, and said flexible sensing layer is configured within said writing area, so that a writing trace in said writing area can be sensed by said flexible sensing layer and data information corresponding to said writing trace can be generated in said identification calculation module, thus allowing said central data processor to control the display of a calculation result of a formula handwritten in said writing area on said display screen after subsequent identification and analysis of said data information, wherein the number of said writing areas is two, wherein one of said writing areas is configured as a writing region formed by a liquid crystal writing board, and the other said writing area is configured as a paper placement region formed by a paper clip, correspondingly, the number of said flexible sensing layers configured in said writing area is also two, wherein said two flexible sensing layers is arranged to be interconnected via flat cable, with one of said flexible sensing layers electrically connected to said identification calculation module, forming an electrical connection relationship between said two flexible sensing layers and said identification calculation module.

11. The calculator capable of outputting results based on handwritten formulas, as recited in claim 10, wherein said calculator is designed to be foldable and has two working surfaces, wherein said display screen, corresponding buttons of said keypad circuit, and said writing area configured as a writing region formed by the liquid crystal writing board, are arranged on the same working surface, while said writing area configured as a paper placement region formed by said paper clip, is arranged on another working surface.

12. The calculator capable of outputting results based on handwritten formulas, as recited in claim 11, wherein said calculator comprises a first flexible protective layer, a second flexible protective layer, and a housing, wherein said housing is fixed to said first flexible protective layer, said power supply unit, said calculation processor, said keypad circuit, said display screen, said central data processor, said identification calculation module, said liquid crystal writing board, and one of said flexible sensing layers are all arranged in said housing, correspondingly form a structural form in which said display screen, the corresponding buttons of said keypad circuit, and said writing region formed by said liquid crystal writing board, are arranged on the same working surface, wherein said paper clip is arranged on said second flexible protective layer, forming another said writing area in said second flexible protective layer, the other said flexible sensing layer is arranged in a sandwich form between said second flexible protective layer and is configured in said writing area, correspondingly form a structural form in which said writing area configured as a paper placement region formed by said paper clip, is arranged on another working surface, said first flexible protective layer and said second flexible protective layer are flexibly connected to form a foldable structure between said two working surfaces.

13. The calculator capable of outputting results based on handwritten formulas, as recited in claim 12, wherein said first flexible protective layer has an intermediate layer arranged in a sandwich form, said housing is fixed to said first flexible protective layer in a state of being fixed to said intermediate layer.

14. The calculator capable of outputting results based on handwritten formulas, as recited in claim 13, wherein the outer layer of said first flexible protective layer, which has a sandwich structure, and the outer layer of said second flexible protective layer, which also has a sandwich structure, are integrally connected leather layers, thereby forming a flexibly connected structural between said first flexible protective layer and said second flexible protective layer.

\* \* \* \* \*